United States Patent
Baveja et al.

(10) Patent No.: US 9,935,882 B2
(45) Date of Patent: Apr. 3, 2018

(54) CONFIGURATION OF NETWORK ELEMENTS FOR AUTOMATED POLICY-BASED ROUTING

(71) Applicant: CISCO TECHNOLOGY, INC., San Jose, CA (US)

(72) Inventors: Avni Baveja, San Jose, CA (US); Samar Sharma, San Jose, CA (US); Mitali Parthasarathy, Sunnyvale, CA (US); Ashish Purushottam Attarde, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 14/835,435

(22) Filed: Aug. 25, 2015

(65) Prior Publication Data

US 2016/0337244 A1    Nov. 17, 2016

(51) Int. Cl.
| | |
|---|---|
| G06F 15/16 | (2006.01) |
| H04L 12/803 | (2013.01) |
| H04L 29/08 | (2006.01) |

(52) U.S. Cl.
CPC ........ *H04L 47/125* (2013.01); *H04L 67/1002* (2013.01)

(58) Field of Classification Search
CPC .......................... H04L 47/125; H04L 67/1002
USPC ......................................................... 709/235
See application file for complete search history.

(56) References Cited

U.S. PATENT DOCUMENTS

| | | |
|---|---|---|
| 6,601,084 B1 | 7/2003 | Bhaskaran et al. |
| 6,779,039 B1 | 8/2004 | Bommareddy |
| 6,996,615 B1 | 2/2006 | McGuire |
| 7,284,053 B1 | 10/2007 | O'Rourke |
| 7,415,523 B2 | 8/2008 | O'Rourke |
| 7,542,423 B1 | 6/2009 | Morishige |
| 7,623,455 B2 | 11/2009 | Hilla |
| 7,852,774 B2 | 12/2010 | Shen et al. |
| 8,259,722 B1 | 9/2012 | Kharitonov |
| 8,553,552 B2 | 10/2013 | Hu |
| 8,868,726 B1 | 10/2014 | Tu |
| 8,937,942 B1 | 1/2015 | Li |
| 9,246,998 B2 | 1/2016 | Kumar |
| 9,264,400 B1 * | 2/2016 | Lin ..................... H04L 63/0245 |
| 2003/0097405 A1 | 5/2003 | Laux |
| 2005/0207420 A1 | 9/2005 | Shanklin |
| 2005/0281205 A1 | 12/2005 | Chandwadkar |
| 2005/0281257 A1 | 12/2005 | Yazaki |
| 2006/0098573 A1 | 5/2006 | Beer |

(Continued)

OTHER PUBLICATIONS

PCT Aug. 18, 2016 International Search Report and Written Opinion from the International Application Serial No. PCT/US2016/031652; 10 pages.

*Primary Examiner* — Alan S Chou (57) ABSTRACT

In one embodiment a forwarding policy from a first network node coupled to a network element is received. The forwarding policy specifies an address of a second network node coupled to the network element. A plurality of ports of the network element are identified, wherein the second network node is accessible from the network element through each of the plurality of ports. The forwarding policy is applied to the plurality of ports of the network element. Network traffic received at a port of the plurality of ports from the second network node is forwarded to the first network node.

20 Claims, 7 Drawing Sheets

(56) References Cited

U.S. PATENT DOCUMENTS

| | | |
|---|---|---|
| 2006/0227705 A1 | 10/2006 | Chandwadkar |
| 2007/0165622 A1 | 7/2007 | O'Rourke |
| 2008/0084880 A1 | 4/2008 | Dharwadkar |
| 2009/0135722 A1 | 5/2009 | Boers et al. |
| 2011/0235508 A1 | 9/2011 | Goel |
| 2011/0261811 A1 | 10/2011 | Battestille et al. |
| 2011/0283013 A1 | 11/2011 | Grosser |
| 2012/0163164 A1 | 6/2012 | Terry |
| 2012/0163180 A1 | 6/2012 | Goel |
| 2012/0188891 A1 | 7/2012 | Valimaa et al. |
| 2012/0246637 A1 | 9/2012 | Kreeger |
| 2012/0303809 A1 | 11/2012 | Patel |
| 2013/0044636 A1 | 2/2013 | Koponen |
| 2013/0235868 A1 | 9/2013 | Owens |
| 2013/0272305 A1 | 10/2013 | Lefebvre |
| 2013/0343408 A1 | 12/2013 | Cook |
| 2014/0019602 A1 | 1/2014 | Murthy |
| 2014/0025986 A1 | 1/2014 | Kalyanaraman et al. |
| 2014/0269513 A1 * | 9/2014 | Yu .......................... H04L 67/00 370/328 |
| 2014/0321462 A1 | 10/2014 | Kancherla |
| 2015/0188731 A1 * | 7/2015 | Daly ................. H04L 12/5689 709/224 |
| 2015/0326473 A1 * | 11/2015 | Dunbar ............... H04L 12/4633 370/392 |
| 2016/0182379 A1 | 6/2016 | Mehra |
| 2016/0251607 A1 | 9/2016 | Kwak |

* cited by examiner

CONFIGURATION OF NETWORK ELEMENTS FOR AUTOMATED POLICY-BASED ROUTING

RELATED APPLICATION

This application claims benefit under 35 U.S.C. § 119(e) of U.S. Provisional Application Ser. No. 62/161,004, entitled "DISTRIBUTED SERVICE POLICY ABSTRACTION LAYER," filed May 13, 2015.

TECHNICAL FIELD

This disclosure relates in general to the field of communications and, more particularly, to configuration of network elements for automated policy-based routing.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a forwarding policy from a first network node coupled to a network element is received. The forwarding policy specifies an address of a second network node coupled to the network element. A plurality of ports of the network element are identified, wherein the second network node is accessible from the network element through each of the plurality of ports. The forwarding policy is applied to the plurality of ports of the network element. Network traffic received at a port of the plurality of ports from the second network node is forwarded to the first network node.

Example Embodiments

Figure 1:
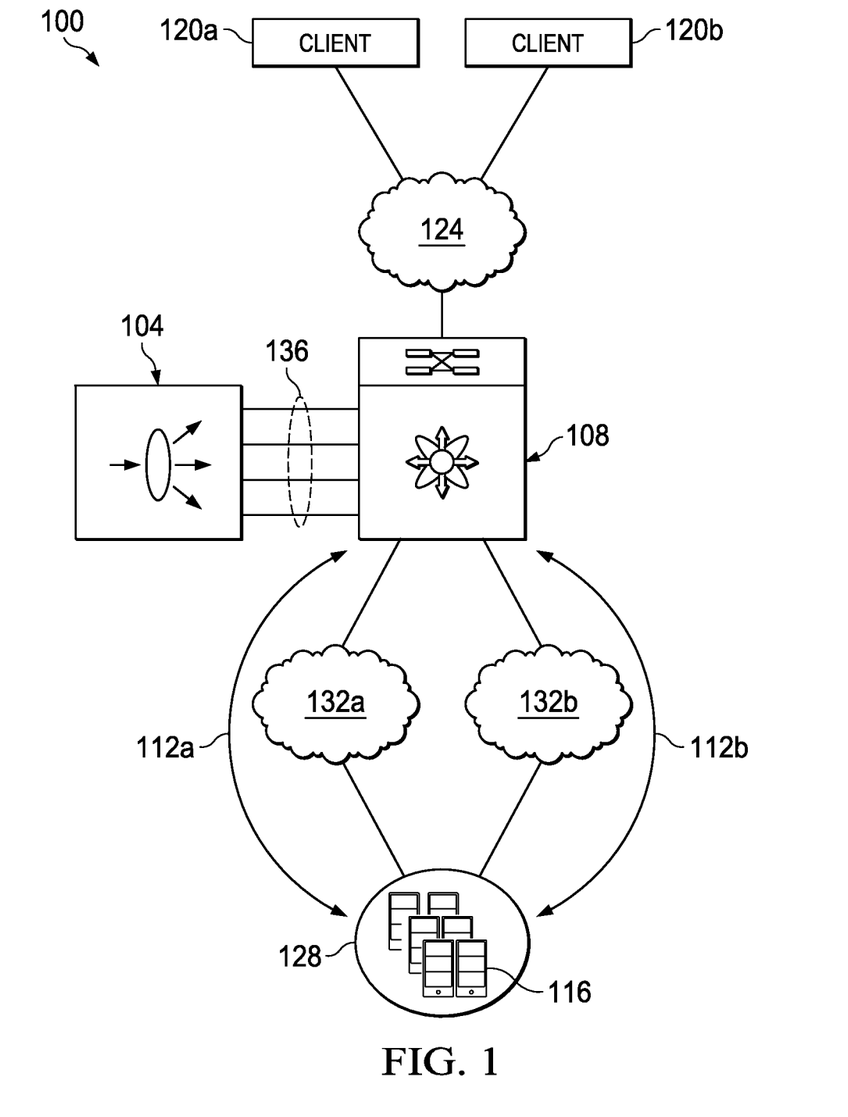
FIG. 1 illustrates a block diagram of a system comprising a service appliance and a network element having multiple paths to one or more destination servers in accordance with certain embodiments.

FIG. 1 illustrates a block diagram of a system 100 comprising a service appliance 104 and a network element 108 having multiple paths 112 to one or more destination servers 116 in accordance with certain embodiments. System 100 also includes a plurality of client devices 120 coupled to the network element 108 through network 124. The destination servers 116 may be part of a server farm 128 or other grouping of devices operable to respond to requests from clients 120. The destination servers 116 are coupled to the network element 108 through networks 132a and 132b.

Network services are often inserted into a network such as system 100. The network services may include, by way of nonlimiting example, load balancing or application delivery services. The network services may be performed by one or more service appliances 104, which may be server blades or line cards integrated into network elements 108 (e.g., switches, routers, etc.) or may be external appliances. The provision of network services typically necessitates manual configuration of network elements 108 and other network nodes (e.g., servers).

For example, when providing load balancing or application delivery services, a client device 120 sends a request (e.g., one or more packets) that is intercepted by a service application running on one or more of the service appliances 104. For example, the one or more packets of the request may have a source address of the client device and a destination address of the service appliance (e.g., a virtual Internet Protocol (IP) address that may be associated with one or more services that may be provided by each of servers 116 of server farm 128). Upon receiving the request from the client, the service application of service appliance 104 is configured to select a server (e.g., destination server 116) among a group of servers (e.g., server farm 128) to fulfill the request. The service application may then change the destination address of the one or more packets to an address of the selected destination server and forward the packets having the source address of the client device and the destination address of the selected server to the selected server.

To ensure that return packets (e.g., packets flowing from the selected server to the client device) are transmitted via the service application (so as to appear to the client device to have originated from the address of the service appliance 104), routing/redirection policies may be set up on various network nodes (e.g., network elements 108) in between the service appliance 104 and the destination server 116. The process of manually configuring policies on each network node to handle traffic redirection (so that return traffic from the destination server to the client is sent to the service appliance 104) and manually updating configuration policies based on the availability of the destination servers is tedious, time consuming, and error-prone.

In various embodiments of the present disclosure, methods and apparatuses for automating the configuration of return traffic redirection to a service appliance 104 by injecting forwarding policies into network elements 108 are disclosed herein. Various embodiments may include establishing a communication channel between a service appliance and a network element; receiving, at the network element from the service appliance, a forwarding policy that requests the network element to forward predetermined packets (e.g., packets received from one or more destination servers) to the service appliance; identify which ports of the network element are included in routes to the one or more destination servers, implementing the forwarding policy on the identified ports of the network element, and sending the forwarding policy to other network elements that are located between the network element and the one or more destination servers. The other network elements may perform a similar process to ensure that return traffic is directed back to the service appliance 104 before delivery to the client 120.

When a return packet having a source address of a destination server and a destination address of a client device is received, a network element 108 may determine whether to forward the return packet towards the service appliance 104 based on the forwarding policy and will transmit the return packet towards the service appliance 104 in the event of an affirmative determination (if the network element 108 is adjacent the service appliance it will deliver the return packet to the service appliance). In at least some embodiments, network element 108 may set the "next hop" IP address of return traffic reaching the network element to the IP address of the service appliance 104 without modifying packets of the return traffic. The network element 108 then forwards the return traffic to the service appliance, which then directs the return traffic to the client with a source address of the service appliance 104 and a destination address of the client device 120 (e.g., the service appliance 104 may modify the source address of the packets to the IP address of the service appliance).

Client devices 120 may be any suitable computing devices operable to send and receive network traffic (e.g., data packets). In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data. A client device may include an appropriate operating system, such as Microsoft Windows, Linux, Android, Mac OSX, Apple iOS, Unix, or similar operating system. Client devices 120 may be communicatively coupled to one another and to other network resources via network 124.

Network element 108 may be any device or system operable to process and/or forward traffic in conjunction with forwarding policies. For example, network elements may comprise network switches, routers, servers (physical servers or servers virtually implemented on physical hardware), machines (physical machine or machines virtually implemented on physical hardware), end user devices, access points, cable boxes, gateways, bridges, load balancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with processing and/or forwarding network traffic. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

In some embodiments, network element 108 includes a multi-port network bridge that processes and routes data at a data link layer (Layer 2). In another example, network element 108 may process and/or route data at other various layers such as a Layer 3 network layer, Layer 4 (with network address translation and load distribution), Layer 7 (load distribution based on application specific transactions), or at multiple layers (e.g., Layer 2 and Layer 3). In certain embodiments, functionalities of a switch may be integrated into other network elements such as gateways, routers, or servers. In various embodiments, network element 108 is a managed switch (e.g., managed using a command line interface (CLI), a web interface, etc.). In one particular embodiments, network element is a Cisco® N7K switch.

A network element 108 may connect to service appliance 104 over a communication channel 136 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., network element 108) to one or more receivers (e.g., service appliance 104). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 100, communication channel 136 may be a single channel deployed for both control messages (i.e., messages that include control packets) and data messages (i.e., messages that include data packets).

In some embodiments, service appliance 104 may be a discrete (and generally separate) hardware device or virtual machine with integrated software (e.g., firmware), designed to provide one or more network services including load balancing, firewall, intrusion prevention, virtual private network (VPN), proxy, or other network services.

In some embodiments, service appliance 104 is assigned an IP address (which in some embodiments may be a virtual IP address) or other address to which clients may address network traffic. Clients may request a service from server farm 128 (or other group of servers) by sending a request to the address of the service appliance 104. The traffic is delivered to the service appliance 104 by the network element 108 based on the destination address (matching the address of the service appliance) of the traffic. In some embodiments, the service appliance 104 is operable to load balance the traffic received from clients 120 among a plurality of servers 116, based on any suitable criteria, such as the source IP address, source media access control (MAC) address, source port, protocol (e.g., one or more L3 protocols such as IPv4 or IPv6 or one or more L4 protocols such as Transmission Control Protocol (TCP) or User Datagram Protocol (UDP)), one or more QoS parameters, one or more virtual local area network (VLAN) identifiers, and/or other suitable information associated with (e.g., specified by) the header or body of one or more packets of the network traffic.

Upon selection of a destination server 116 from a plurality of available servers, the service appliance may then send the network traffic to the destination server. For example, the service appliance may modify the destination address of the packet to be the address (e.g., IP address) of the destination server 116 and then send the packet through the network element 108 towards the destination server.

In some cases, network element 108 may be configured with an intelligent service card manager module (ISCM), and service appliance 104 may be configured with a corresponding intelligent service card client module (ISCC). The ISCM and ISCC can form part of an infrastructure for configuring service appliance 104 on the network element 108, e.g., as a virtual line card in network element 108. The ISCM and ISCC may comprise any suitable logic, including hardware, software, or a combination thereof. In some embodiments, the ISCM or ISCC may comprise software executed by a processor.

In some cases, the ISCC and ISCM may be configured to allow service appliance 104 to appear as a virtual line card, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance may be referred to simply as "appliance" or "module" herein. Hence, a virtual line card is interchangeable (in certain instances) with an ISCM. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a network element, for example, on an appropriate physical slot. Virtual service modules are similarly configurable within a network element.

In an example, a (external) service appliance 104 may connect to a network element 108 (e.g., switch) and behave like a service module within the network element without having to take up a physical slot in the network element. Such configurations may consolidate the provisioning of appliances and enable the appliances to have the benefits of being a service module within the network element. The task for provisioning and configuring of these service appliances is performed mostly by the infrastructure provided on the network element, making it easy for network administrators to add/remove service appliances in the network.

According to embodiments of the present disclosure, an appliance user can enjoy the benefit of a service module's simple configuration and operation using the infrastructure of network element 108. For example, setting up service appliance 104 for network configurations may be unnecessary. Substantially all such configurations may be made via network element 108, instead of service appliance 104. Service appliance 104 may offload (i.e., transfer) any network (e.g., L2/L3 network) specific control plane and data plane operations to network element 108. Data path acceleration that leverages an application specific integrated circuit (ASIC) (potentially embedded in network element 108) may also be possible in various embodiments. Network element 108 may communicate control messages to service appliance 104 over communication channel 136. Thus, configuration and provisioning of services within service appliance 104 may be implemented via network element 108.

A service appliance 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

Service appliance 104 may load balance among servers 116 belonging to one or more server farms 128 coupled to network element 108. A server farm 128 comprises one or more servers 116 operable to communicate with clients 120. In some embodiments, various servers 116 within server farm 128 may each be operable to provide one or more services to clients 120. For example, servers 116 may be redundant with each other such that any server of at least a subset of servers of the server farm may provide the same service(s) to clients 120. In some embodiments, client 120 may send a server 116 a request, server 116 may perform processing based on the request, and may respond to the client with the requested data. In particular embodiments, individual servers in server farm 128 may communicate with other servers in the same server farm 128 via one or more network elements (e.g., switches). Servers in server farm 128 may communicate with servers in another server farm via one or more network elements 108 in various implementations.

Although various figures herein illustrate server farms 128, it should be appreciated that other groupings of servers may be used. As used herein, a server may refer to any device configured to communicate network traffic with clients 120 via one or more networks. Thus the term "server" may encompass computers, virtual machines, network appliances, application servers, routers, switches, gateways, bridges, load balancers, firewalls, processors, modules, or any other suitable device, component, proprietary element, or object operable to exchange information in a network environment. Moreover, the servers 116 may include any suitable hardware, software, components, modules, interfaces, or objects that facilitate the operations thereof. This may be inclusive of appropriate algorithms and communication protocols that allow for the effective exchange of data or information. In one example, server farm 128 may be replaced with a LAN connecting desktop computers in a small office. In another example, server farm 128 may be replaced with a network of wireless communication devices. In yet another example, server farm 128 may be replaced with one or more supercomputers. Various other configurations and devices are contemplated within the broad framework of the present disclosure.

The networks described herein (e.g., networks 124, 132*a*, and 132*b*) may be any suitable network or combination of one or more networks operating on one or more suitable networking protocols. A network may represent a series of points, nodes, or network elements and interconnected communication paths for receiving and transmitting packets of information that propagate through a communication system. For example, a network may include one or more firewalls, routers, switches, security appliances, antivirus servers, or other useful network devices. A network offers a communicative interface between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment depending on the network topology. A network can comprise any number of hardware or software elements coupled to (and in communication with) each other through a communications medium. As one example, a network may include one or more network elements 108 in the path from a source node coupled to the network and a destination node. In some embodiments, a network may simply comprise a connection such as a cable (e.g., an Ethernet cable), air, or other transmission medium.

Network element 108 may reach the destination server 116 via any number of different paths, such as network path 112a or network path 112b. A network path is comprised of the network segments and network nodes that data from a source passes through on its way to a destination. In the embodiment depicted, network path 112a may include a first port of network element 108 while network path 112b includes a second port of network element 108. In various embodiments, network paths may or may not share one or more segments or network nodes. In various embodiments, packets sent between network element 108 and destination server 116 may leave from the same port of network element 108, but may still travel different paths to the destination server 116. In some situations, a packet from client 120a to destination server 116 may travel from a first port of network element 108 through path 112a to destination server 116 while a packet from destination server 116 to client 120a may travel through path 112b to a second port of network element 108 on its way to client 120a.

In a datacenter or other configuration, it may be common to have a network element 108 coupled to one or more server farms via multiple network paths 112 (utilizing a plurality of the ports of the network element 108) as shown in system 100. This means that one or more of the network paths 112 may be used at any point of time to send traffic between servers 116 and clients 120. In some embodiments, each port of the switch has the same weight (i.e., traffic is equally likely to exit the switch at each port) and there may be no predetermined way to know which of the ports will be used to reach the server 116 or which of the ports will be used for return traffic from the server. Such a scenario may be referred to as an equal cost multi-path (ECMP) case. Accordingly, when a network element 108 determines that it should implement a forwarding policy to forward traffic received from a server 116 back to the service appliance 104, the network element 108 may determine which of its ports may be used to reach the server 116. In some embodiments, an ISCM registers with a unified/unicast routing information base (URIB) to determine the route and nexthop port through which network element 108 can reach the destination server 116. In various embodiments, a URIB is a software module running on a control plane of network element 108 and may communicate with the ISCM via one or more APIs. A URIB may have information about which IP routes are set up for each port of the network element. The ISCM may communicate the IP address of the destination server and the URIB will return one or more nexthop IP addresses and/or one or more ports through which the nexthop IP addresses may be reached. If the URIB only returns one nexthop port at a time, the appropriate APIs can be called multiple times to obtain all the nexthop ports in the ECMP case. Subsequently, the forwarding policy will be applied on each of the identified ports. The network element 108 may store an indication of which ports the forwarding policy has been applied to, such that if the server 116 later becomes unreachable through one or more of the ports, the forwarding policy may be removed from each port from which the server 116 is unreachable.

Figure 2:
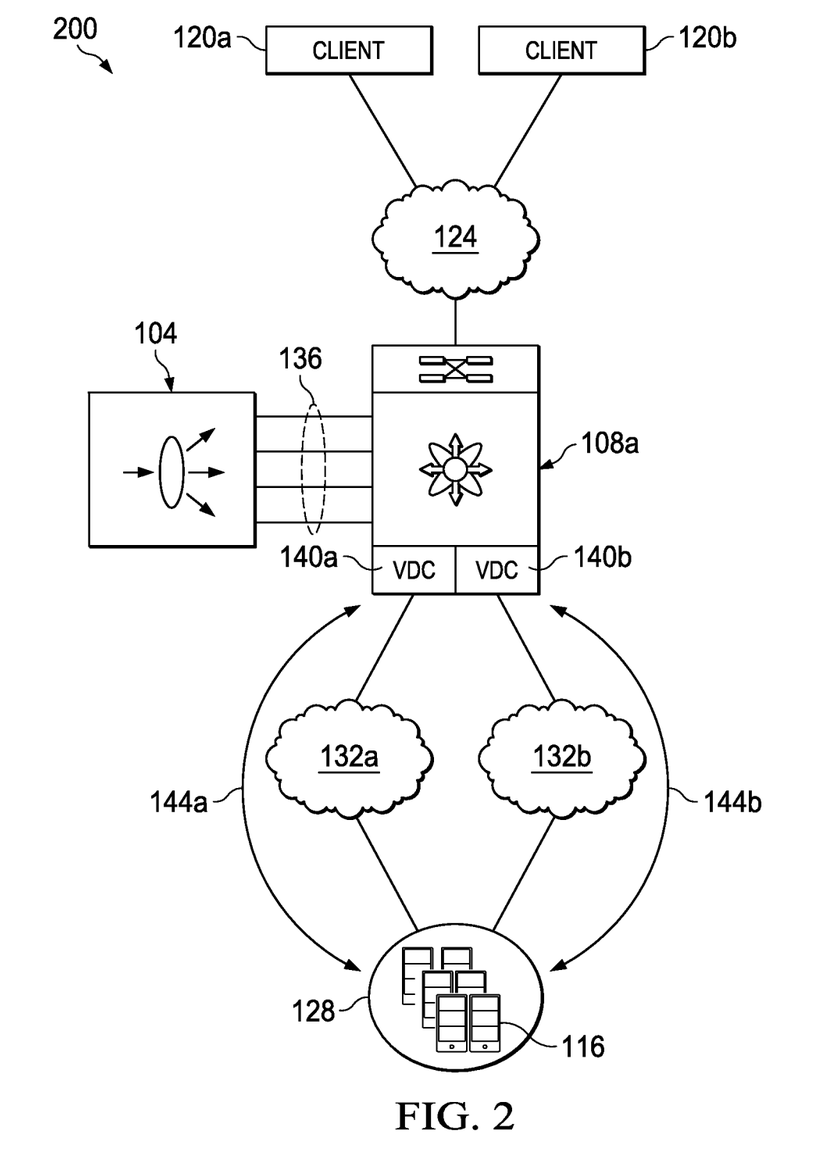
FIG. 2 illustrates a block diagram of a system comprising a service appliance and a network element having multiple virtual device contexts each having at least one path to one or more destination servers in accordance with certain embodiments.

FIG. 2 illustrates a block diagram of a system 200 comprising a service appliance 104 and a network element 108a having multiple virtual device contexts (VDCs) 140 each having at least one path to one or more destination servers 116 in accordance with certain embodiments. Network element 108a may have any of the characteristics described herein with respect to network element 108 and vice versa.

VDCs 140a and 140b allow the network element 108 to be virtualized at the device level, presenting the physical network element as multiple logical devices. Each configured VDC 140 presents itself as a unique device to connected users within the framework of the physical network element. A VDC 140 may run as a separate logical entity within the network element, maintaining its own unique set of running software processes, having its own configuration, and being managed by a separate administrator in some situations. A VDC 140 may contain its own unique and independent set of VLANs and virtual route forwarding instances (VRFs). A VRF can be used to virtualize the Layer 3 forwarding and routing tables.

Each VDC 140 may have physical ports allocated to it, thus allowing for the hardware data plane to be virtualized as well. In at least some embodiments, the physical switch ports of network element 108 are resources that cannot be shared between VDC 140s. Within each VDC 140, a separate management domain can manage the VDC 140 itself, thus allowing the management plane itself to also be virtualized.

In some embodiments, a network element capable of being configured with VDCs has a default setting where all physical ports on the network element are assigned to a default VDC 140 (e.g. VDC 140a). When a new VDC 140b is created, an administrator may be required to assign a set of physical ports from the default VDC 140a to the newly created VDC 140b, providing the new VDC 140b with a means to communicate with other devices on the network. In at least some embodiments, once a physical port is assigned to a particular VDC 140, it is bound exclusively to that VDC 140, and no other VDC 140 has access to that port. In particular embodiments, inter-VDC communication is not facilitated from within the network element 108, but a discrete external connection must be made between ports of different VDC 140s to allow communication between them.

In various configurations, a client device 120 may communicate with the server 116 through any of multiple VDCs 140 of a network element 108. For example, client device 120a might send a request to the server via network path 144a using VDC 140a, but receive a response from the server 116 through network path 144b using VDC 140b. For example, traffic may be sent from the client to the server using a first VLAN associated with VDC 140a while return traffic may be sent from the server to the client using a second VLAN associated with VDC 140b.

Each VDC 140 may be associated with its own instance of an ISCM. However, each ISCM instance is local to its particular VDC and does not manage the operation of other VDCs or their physical ports. In various embodiments, a network element 108 may include or provide access to a global database that is accessible by each VDC (e.g., via its ISCM) of the network element 108. One ISCM may create a forwarding policy, store the policy in the shared database, and notify the other ISCMs of the network element that a policy has been added to the shared database. Each other ISCM on the network element 108 may then access the new policy from the shared database and determine whether the VDC is able to reach the server 116 and the service appliance 104. If so, the forwarding policy is applied to all of the physical ports of the VDC that are able to reach the server 116. When a policy needs to be deleted, the global shared database is consulted to determine all the VDCs in which the policy is applied and delete requests are sent out accordingly.

Figure 3:
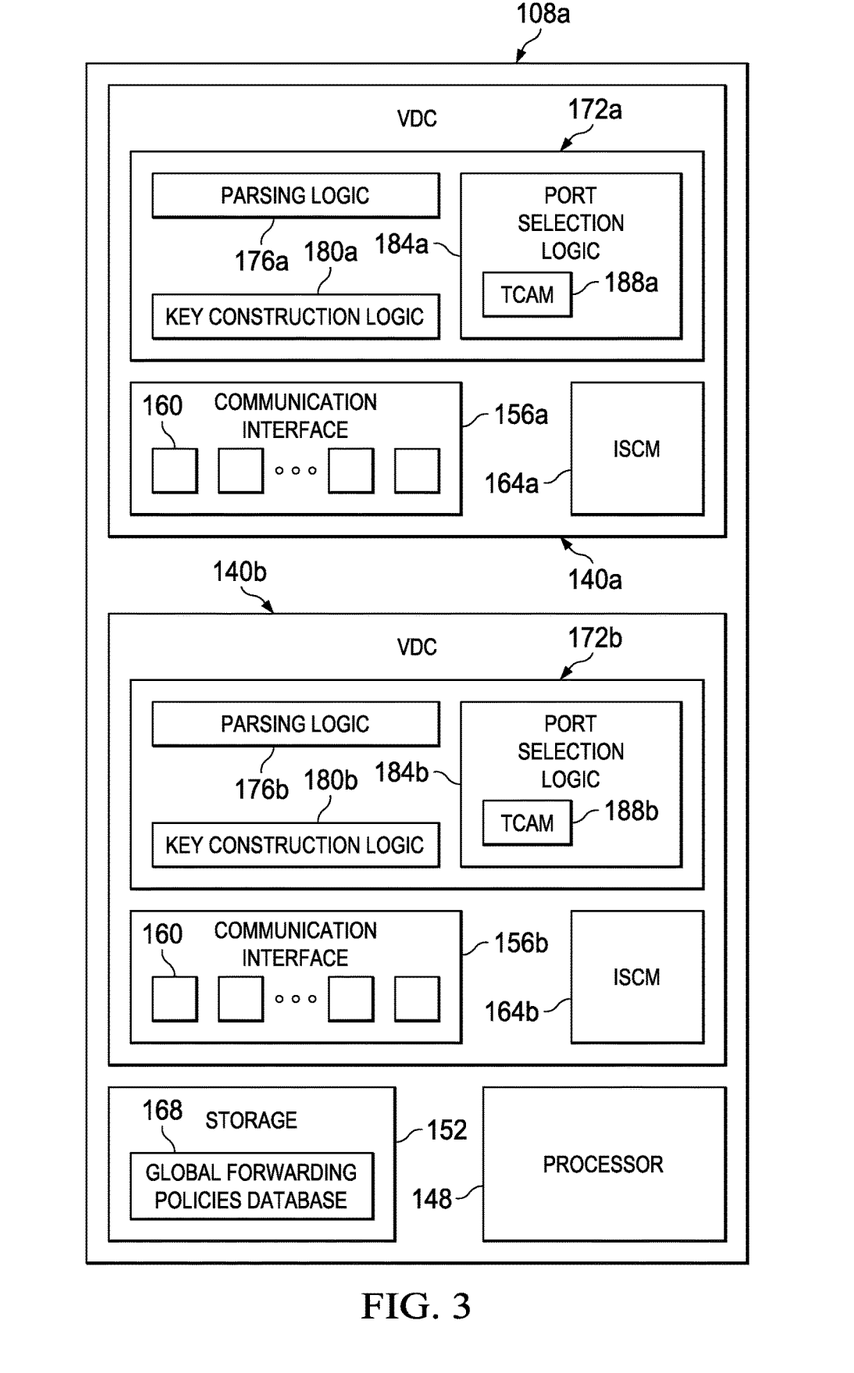
FIG. 3 illustrates a block diagram of a network element in accordance with certain embodiments.

FIG. 3 illustrates a block diagram of a network element 108a in accordance with certain embodiments. The network element 108a is configured to include two VDCs 140a and 140b, though a network element 108 may be configured with any suitable number of VDCs including zero (in which case the components illustrated inside of a VDC 140 may be associated with the entire network element 108 rather than a VDC 140 of the network element). The network element 108a also includes processor 148 and storage 152.

In the embodiment depicted, network element 108a includes a computer system to facilitate performance of its operations. In particular embodiments, a computer system may include a processor, storage, and one or more communication interfaces, among other components. As an example, network element 108a comprises a computer system that includes one or more processors 148, storage 152, and one or more communication interfaces 156 that are virtualized through VDC 140a and 140b. These components may work together in order to provide functionality described herein.

A communication interface 156 may be used for the communication of signaling and/or data between network element 108 and one or more networks (e.g., 124, 132a, or 132b) and/or network nodes (e.g., servers 116, service appliance 104) coupled to a network or other communication channel. For example, communication interface 156 may be used to send and receive network traffic such as data packets. Each communication interface 156 may send and receive data and/or signals according to any suitable standard such as Asynchronous Transfer Mode (ATM), Frame Relay, or Gigabit Ethernet (or other IEEE 802.3 standard). In a particular embodiment, communication interface 156 comprises one or more physical ports 160 that may each function as an ingress and/or egress port. As one example, communication interface 156 may comprise a plurality of Ethernet ports.

Processor 148 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Storage 152 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Storage 152 may store any suitable data or information utilized by network element 108, including software embedded in a computer readable medium, and/or encoded logic incorporated in hardware or otherwise stored (e.g., firmware). Storage 152 may also store the results and/or intermediate results of the various calculations and determinations performed by processor 148. As an example, software to perform the functions of the ISCMs 164 when executed by a processor may be stored in storage 152. In the embodiment depicted, storage 152 also includes global forwarding policies database 168 which may be accessible by all of the ISCMs 164 of the various VDCs 140 as described earlier.

In the embodiment depicted, each VDC 140 includes its own instance of an ISCM 164, a communication interface 156 with one or more physical ports 160, and forwarding logic 172. The ISCM may be capable of communicating the forwarding policies received from a service appliance 104, another ISCM 164, (e.g., of the same or a different network element 108), or a network administrator to other portions of network element 108 (e.g., to forwarding logic 172).

According to various embodiments, ISCM 164 may also offer various functionalities such as handling (i.e., accommodating, managing, processing, etc.) messages between a network element 108 or a VDC 140 of a network element and one or more service appliances 104. For example, functions in association with such messages may concern high availability activities, timer events, packet switch stream, American Standard Code for Information Interchange (ASCII) generation, logging, event handling, health monitoring, debugging, etc.

After ports (e.g., appliance ports and network element (e.g., switch) ports) have been configured, ISCM 164 and a corresponding ISCC of service appliance 104 may perform auto-discovery and bootstrap to establish an appropriate control channel. After the control channel is established, applications in service appliance 104 may send control messages (e.g., using the UDP socket interface) to the ISCC through an application control plane. The application control plane generally encompasses one or more software components for performing workflow management, self-management, and other application control layer processes. The ISCC may forward the control messages to an ISCM 164 of network element 108a over communication channel 136. In example embodiments, ISCM 164 and the ISCC may communicate via UDP packets; however, various other protocols and formats may be accommodated by the teachings of the present disclosure. ISCM 164 may use processor 148 and storage 152 to perform functions associated with the service appliance 104 in network element 108. Similarly, service appliance 104 may be provisioned with (or have access to) a processor and similar storage, which the ISCC may use to perform functions described herein in service appliance 104.

Forwarding logic 172 may be operable to apply forwarding policies indicated by APBR requests (e.g., policies that may be automatically distributed to and implemented by the necessary network elements in a network without manual configuration at each network element) or user-specified traffic forwarding policies to traffic received via communication interface 156 and send the traffic processed by the policies to communication interface 156 for forwarding out of the appropriate port 160 of network element 108. In the embodiment depicted, forwarding logic 172 includes parsing logic 176, key construction logic 180, and port selection logic 184. In various embodiments, any suitable portion of forwarding logic 172 may comprise programmable logic (e.g., software/computer instructions executed by a processor), fixed logic, programmable digital logic (e.g., an FPGA, an EPROM, an EEPROM, or other device), an ASIC that includes digital logic, software, code, electronic instructions, or any suitable combination thereof. In a particular embodiment, forwarding logic 172 comprises an ASIC or other device that is operable to perform customized traffic forwarding in hardware by utilizing logic (e.g., one or more memories such as TCAM 188) that is reprogrammable by an entity (e.g., ISCM 164) based on traffic customization information (e.g., APBR requests or traffic forwarding policies received from a network administrator). In such an embodiment, the functions of parsing logic 176, key construction logic 180, and port selection logic 184 are performed in hardware by such logic (in contrast to an implementation where such functions may be performed through software instructions executed by a network processor). Reconfiguration of the logic may be performed by storing different values in memory of the forwarding logic 172 such as TCAM 188 or other memory element while the rest of the forwarding logic 172 remains fixed. In various embodiments, the values stored in the memory may provide control inputs to forwarding logic 172, but are not typical instructions that are part of an instruction set executed by a processor. By implementing this logic in hardware, the network element 108 may process incoming traffic (e.g., switch/bridge or route the traffic) at much higher speeds (e.g., at line rate) than a device that utilizes a network processor to process incoming network traffic. In other embodiments, any of the operations of the various forwarding logic elements may be performed in software (e.g., with the use of a processor 148).

Parsing logic 176 may be operable to receive packets from a port 160 of network element 108. The parsing logic 176 may be configured to parse information from a received packet. Parsing logic 176 may be configured to parse any suitable information, such as one or more protocols associated with (e.g., included within) the packet (such as an L3 or L4 protocol), a source address (e.g., IP address, MAC address, or other address) of the packet, a destination address (e.g., IP address, MAC address, or other address) of the packet, one or more ports (e.g., source or destination L4 port) associated with the packet, a VLAN identifier, a QoS value, or other suitable information from the header or body of a packet. In some embodiments, the information to be parsed by parsing logic 176 is based on the information included within various forwarding policies implemented by network element 108 or a VDC thereof (which could include forwarding policies associated with various different ports of network element 108). In some embodiments, the parsing logic 176 is configured on a port-by-port basis, such that packets from each port may be parsed based on the forwarding policies associated with that port.

The information parsed by parsing logic 176 is passed to key construction logic 180. Key construction logic constructs a key from the output of the parsing logic 176. The key may contain all or a portion of the information parsed from a packet. The key is then passed to the port selection logic 184.

Prior to receiving a key associated with a data packet, forwarding logic 172 may receive forwarding policies from ISCM 164 and configure itself to implement the forwarding policies. For example, forwarding logic 172 may store forwarding policies associated with a particular port 160 in a content addressable memory, such as a TCAM 188. A TCAM is a species of memory that is addressed by memory contents rather than address, and which provides very fast searching. A TCAM is a species of CAM in which the search can include "don't care" values that require only part of a search tag to be matched.

When a packet is received on a port 160, the key generated by key construction logic 180 (and any other suitable information associated with the packet) may be passed to the port selection logic 184. The port selection logic 184 uses the key to perform a lookup in the TCAM 188. Port selection logic 184 will then forward the traffic through the appropriate port 160 of network element 108 based on a forwarding policy that that matches the information in the key from the packet (and has the highest priority if multiple forwarding policies match the key).

In accordance with various embodiments described herein, a forwarding policy may indicate that an incoming packet should be forwarded to the service appliance 104. For example, the forwarding policy may indicate that the next hop IP address for the packet should be an IP address of the service appliance 104. A routing table associated with the network element 108 (or the appropriate VDC 140) may be modified accordingly, such that the packet may be routed from the network element 108 to the IP address of the service appliance 104 via a port 160 facing the service appliance 104. In some embodiments, the routing table is stored in a separate memory (e.g., static random access memory) from the forwarding policies (e.g., TCAM 188).

In various embodiments, ISCM 164 receives forwarding policies (e.g., via APBR requests) and converts the forwarding policies into a format suitable for use by forwarding logic 208 before communicating these policies to forwarding logic 208. For example, as explained in greater detail in connection with FIG. 6, the forwarding policies may be used to generate one or more Access Control Lists (ACLs) and routemaps.

Figure 4:
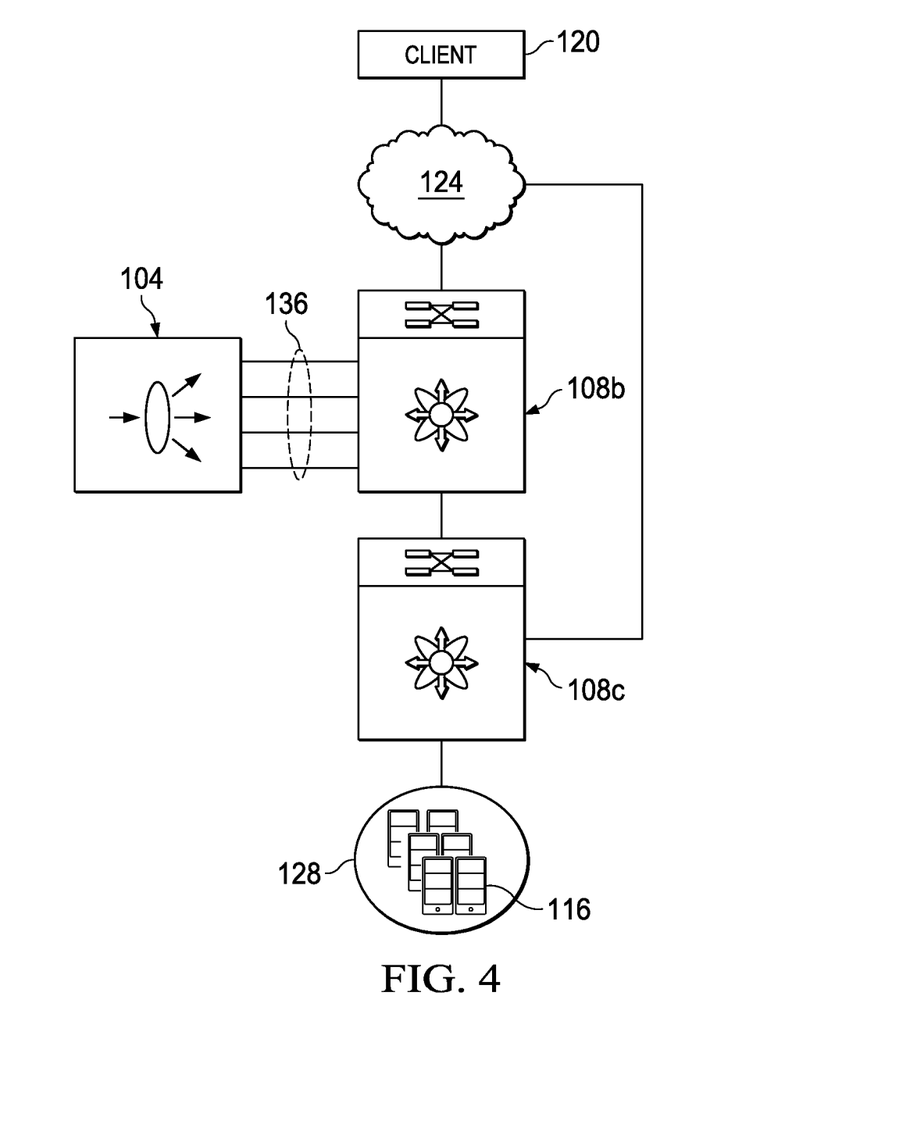
FIG. 4 illustrates a block diagram of a system having multiple L3 network hops between a service appliance and one or more destination servers in accordance with certain embodiments.

FIG. 4 illustrates a block diagram of a system 400 having multiple L3 network hops between a service appliance 104 and one or more destination servers 116 in accordance with certain embodiments. In the embodiment depicted, system 400 includes a network element 108*b* coupled to client 120 via network 124 and to service appliance 104 via communication channel 136. Network element 108*b* may be coupled to server farm 128 through another network element 108*c*. Network elements 108*b* and 108*c* may have any suitable characteristics described herein in connection with network elements 108 and 108*a*. Each network element 108 may be an L3 hop in the path from the service appliance 104 to the server farm 128.

In such embodiments, the forwarding policy to send return traffic from the servers 116 to the service appliance 104 should be implemented by each L3 hop (i.e., network element 108) to redirect the return traffic to the port through which the appliance can be reached. For example, in the embodiment depicted, if the forwarding policy is not applied to network element 108c, then return traffic from server 116 to client device 120 might be routed from network element 108c to a network node in the network 124, thus bypassing network element 108b and service appliance 104.

When a network element 108 (e.g., 108b) receives a forwarding policy, a network operation such as ping or traceroute may be used to determine the route a packet will take from the network element to the server 116. For example, multiple UDP, Internet Control Message Protocol Echo Request, or TCP SYN packets may be addressed to the server 116. Time-to-live (TTL) values of the packets (also known as hop limits) are used in determining the intermediate routers being traversed towards the destination server. From this route, network element 108b may determine a port through which the destination server 116 may be reached (i.e., the port through which the next hop may be reached). The forwarding policy will be applied on this port. The policy will be entered in the global forwarding policies database 168 and will also be sent to the network element that is the next hop (e.g., network element 108c) in the route to the destination server 116. When the network element 108c at the next hop receives the forwarding policy, it will look up the port on which it can reach the destination server 116, apply the policy on that port (e.g., by setting the next hop for return traffic received at the port to the IP address of the network element 108 that it received the forwarding policy from), and store the policy in its own database 168. This process may be repeated for each network element 108 in the route to the destination server 116.

Return traffic reaching each network element 108 will trigger the forwarding policy and will be redirected out of the port through which the service appliance 104 can be reached. With network element 108c, this port will be coupled to network element 108b. The forwarding policy on network element 108b will result in the packet being redirected to the service appliance 104.

Figure 5:
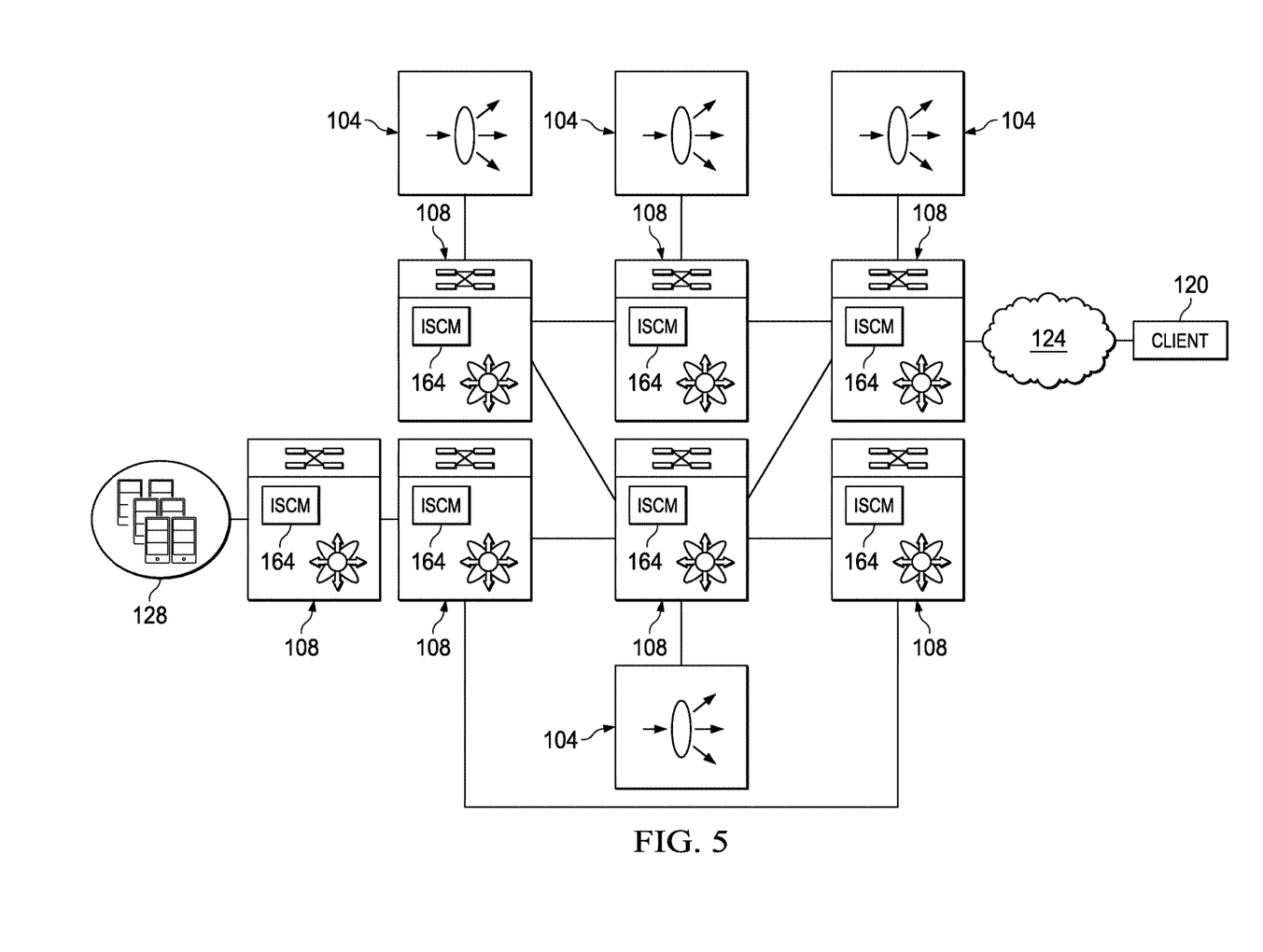
FIG. 5 illustrates a block diagram of a system having multiple L2 and/or L3 network hops between a service appliance and one or more destination servers in accordance with certain embodiments.

FIG. 5 illustrates a block diagram of a system 500 having multiple L2 nodes and/or L3 network hops between a service appliance 104 and one or more destination servers 116 in accordance with certain embodiments. In the embodiment depicted, any particular network element 108 (or VDC thereof) between client 120 and a destination server may function as a router (e.g., as an L3 network hop) and/or as a switch (e.g., as an L2 node).

In such network configurations, a discovery protocol may be run by the ISCM instances of the network elements 108 to facilitate application of forwarding policies on the appropriate network elements 108 (or VDCs thereof) in order to direct return traffic from a destination server 116 back to the service appliance 104 that sent the traffic. The discovery protocol may result in one of the ISCM instances being selected to host a communication server. All other ISCM instances may communicate with the communication server (e.g., the host ISCM) using a client/server model. Thus, ISCM instances do not communicate network configuration information (e.g., forwarding policies) to each other directly, but would communicate the configuration information to the communication server, which would then communicate the configuration information to the other ISCM instances.

In various embodiments, any suitable L2 or L3 multicast protocol may be used by the ISCM instances 164 to discover each other ISCM instance 164 in the network. The discovery procedure may be performed at any suitable time such as on startup, when a new IMSC comes online, or when a host IMSC goes offline. Any suitable parameters of the ISCM instances may be shared with the other ISCM instances to facilitate selection of the host ISCM instance. In particular embodiments each ISCM may multicast an identifier that is unique to the ISCM. As one example, each ISCM instance may multicast an ISCM identifier comprising a number unique to the network element 108 that is running the ISCM instance (e.g., a chassis serial number of the network element) concatenated with an identifier of a VDC associated with the ISCM instance (or a default value if no VDC instances are running on the network element 108 running the ISCM).

Each ISCM may be configured to determine whether it should host the communication server based on the parameters received from the other ISCM instances. Similarly, each ISCM may determine which ISCM is hosting the communication server based on the received parameters. In one example, the ISCM having the lowest valued ISCM identifier is selected as the host, though other suitable methods may be used to select the host ISCM (e.g., the highest valued ISCM identifier, etc.).

The ISCM acting as the host may send out parameters that the other ISCMs (acting as clients) may use to communicate with the communication server hosted by the host ISCM. Any suitable communication protocol may be used to communicate between the client ISCMs and the communication server. In a particular embodiment, the Extensible Messaging and Presence Protocol (XMPP) is used and the host ISCM will configure the communication server to be an XMPP server and send out parameters associated with the XMPP server to the other ISCMs. In other embodiments, an L2 multicast mechanism or an L3 multicast or broadcast mechanism may be used instead of XMPP. In particular embodiments, the parameters associated with the communication server may be sent out by each ISCM during the discovery phase. That is, each ISCM may send parameters that would be needed by the other ISCMs if that ISCM were to host the communication server. For example, the parameters sent by one or more of the ISCMs may include (in addition to the aforementioned ISCM ID), an IP address associated with the ISCM (i.e., the IP address of the VDC or network element 108 running the ISCM), a port to be used to communicate with the other network elements (e.g., an XMPP server port), and any other parameters needed to communicate from or with the communication server. In some embodiments, the IP addresses associated with the ISCMs are exchanged after the ISCMs are discovered.

All of the other ISCMs may connect to the communication server via the host ISCM. When an ISCM receives a forwarding policy from an ISCC of a connected service appliance 104, the forwarding policy may be programmed on the appropriate ports of the network element 108 hosting the ISCM (e.g., via the methods described herein with respect to FIGS. 1 and 2). The ISCM may also send the forwarding policy to the other ISCMs via the communication server. In one example, the communication server may broadcast the forwarding policy to all the other ISCMs. In another example, the communication server may withhold the forwarding policy from one or more of the ISCMs in the network based on information that indicates that the policy should not be applied by the particular ISCM (e.g., the communication server might not send the forwarding policy to an ISCM of a network element that does not transport traffic for a VLAN associated with the forwarding policy).

The receiving ISCMs may apply this policy to one or more ports through which the destination server is reachable if the policy matches particular parameters (e.g., VLAN parameters, route parameters). If the parameters of the ISCM don't match the forwarding policy (e.g., if the destination server is not reachable from the network element associated with the ISCM or if the policy is associated with a VLAN not transported by the network element), the ISCM may store the policy in memory (e.g., database 168) without programming any ports of the network element 108. If the network configuration later changes such that the parameters do match, the policy may then be applied to the appropriate ports of the network element 108.

The communication server may exchange heartbeat messages with the other ISCMs via the communication protocol in use (e.g., XMPP). If it is determined that the communication server has gone offline (e.g., if a heartbeat message is not received within a predetermined time span), a new host ISCM is selected based on the information shared during the discovery phase and the new host ISCM will configure a communication server and share the associated communication parameters with the other ISCMs.

In some embodiments, when a new network element comes online within the network, the ISCM(s) of the network element participates in the discovery protocol by sending the necessary information to the other ISCMs in the network. If the new ISCM has parameters that make it suitable to host the communication server, then it will configure itself accordingly and the other ISCMs will transition to communicate with the new communication server. If the new ISCM is not suitable to host the communication server, then at least one of the other ISCMs will notify the new ISCM of the necessary details of the communication server so that it can receive the existing forwarding policies from the communication server.

Although the above examples, focus on communication of forwarding policies between ISCMs, the communication scheme may be used to communicate any suitable configuration information (e.g., any suitable network policies) among ISCMs.

Figure 6:
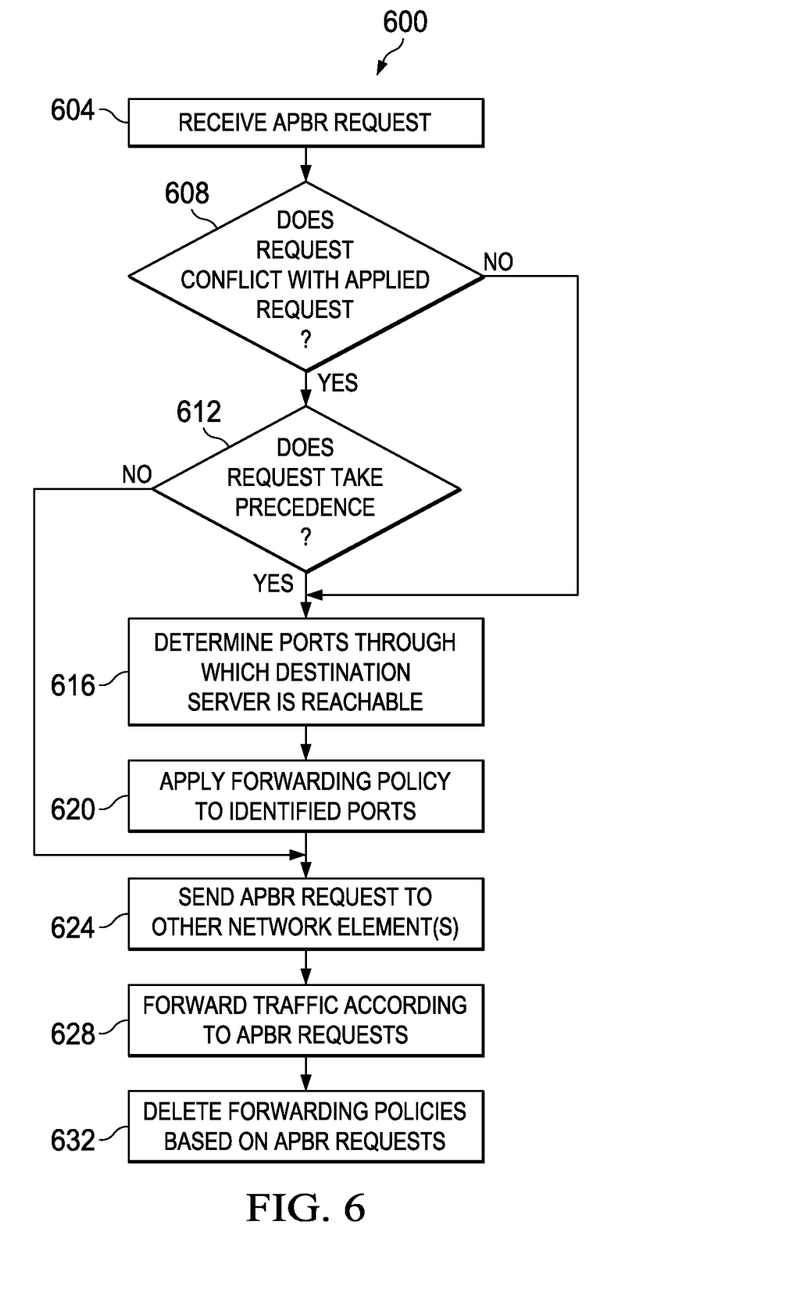
FIG. 6 illustrates an example method for configuring one or more network elements for automatic policy-based routing (APBR) in accordance with certain embodiments.

FIG. 6 illustrates an example method 600 for configuring one or more network elements 108 for APBR in accordance with certain embodiments. At step 604, an APBR request is received. For example, the APBR request may be received from service appliance 104. The APBR request may include information indicating one or more forwarding policies to be applied at one or more network elements. In some embodiments, a control channel of network element 108 is used to automate the task of creating the forwarding policies. Service appliance 104, as a function of its configuration, knows the IP address of the servers 116 in server farm 128, and may send this information to network element 108 in an APBR request. In some embodiments, the APBR request may specify an IP address, port, and protocol of the destination server.

At step 608, it is determined whether the APBR request conflicts with any other APBR requests applied by the network element (or VDC thereof). For example, if an APBR request specifies the same destination server IP address, port, and protocol as an applied APBR request, then it may be considered to conflict with that APBR request. If there are no conflicting APBR requests, then the method moves to step 616. If there is a conflicting APBR request, then it is determined at step 612 whether the received APBR request takes precedence over the applied APBR request. Any suitable method may be used to determine which APBR request should take precedence. In one example, an APBR request received at a network element from a service appliance that is attached to that network element takes precedence over an APBR request received from another network element. If the received APBR request takes precedence, the method moves to step 616, otherwise the method will move to step 624.

At step 616, the ports through which the destination server 116 is reachable are determined. In particular embodiments, an ISCM of each VDC of a network element 108 may determine which of its ports may reach the destination server 116.

At step 620, a forwarding policy based on the APBR request is applied to each of the ports identified at step 616. In some embodiments, this may involve creating an Access Control List (ACL) and an associated routemap. The ACL may have matching criteria comprising the protocol used by the server 116 to send packets, the IP address of the server 116, and the port of the server 116. The ACL will permit all traffic matching the criteria (such that it is not blocked by network element 108). The specified protocol in the ACL may include, by way of nonlimiting example, any L4 protocol such as TCP, UDP, or both TCP and UDP.

A routemap may be associated with the ACL so as to set the nexthop IP for traffic matching the ACL criteria. This association may be stored in any suitable location, such as database 168. In the case of a first ISCM that is closest to (e.g., connected to) the service appliance 104, the next hop IP address is set to the IP address of the service appliance 104. In the case of a second ISCM that is in a network path between the first ISCM and the destination server, the next hop IP address may be set to the IP address of an ISCM upstream from the second ISCM (e.g., the IP address of the first ISCM or a different ISCM between the first ISCM and the second ISCM). The routemap is then applied to all the ports of the network element 108 that are identified as being able to reach the destination server 116. Thus, in the case of a single APBR request applicable to multiple nexthop interfaces (i.e., ports) to the real server, the routemap is applied on each of the nexthop interfaces. When the nexthop interface already has a route map assigned to it, a sequence to an existing routemap may be appended.

At step 624, the APBR request is forwarded to one or more other network elements 108 on the possible network paths to the destination server 116. These network elements may perform steps similar to those described above.

At step 628, data packets from the server 116 to client 120 are forwarded by the network element 108 at which the APBR request was implemented to the service appliance 104, which modifies the source address of the packets to match the address of the service appliance 104 and then sends the packets back through the network element 108 to the client 120.

At step 632, forwarding policies based on the APBR requests are deleted. In some embodiments, various events may trigger an automatic purge of forwarding policies. For example, forwarding policies may be purged in response to a server 116 becoming unavailable or in response to events associated with the service appliance, such as health monitoring failure, service appliance reboot, forced CLI or user-triggered shutdown of the service, or other suitable events. In various embodiments, if one of these events occurs, the routemap may be removed from the ports and the routemap and the ACL are deleted. The network element 108 may also instruct downstream network elements 108 to delete their forwarding policies associated with the service appliance and/or server 116.

Some of the steps illustrated in FIG. 6 may be repeated, combined, modified or deleted where appropriate, and additional steps may also be included. Additionally, steps may be performed in any suitable order without departing from the scope of particular embodiments.

Figure 7:
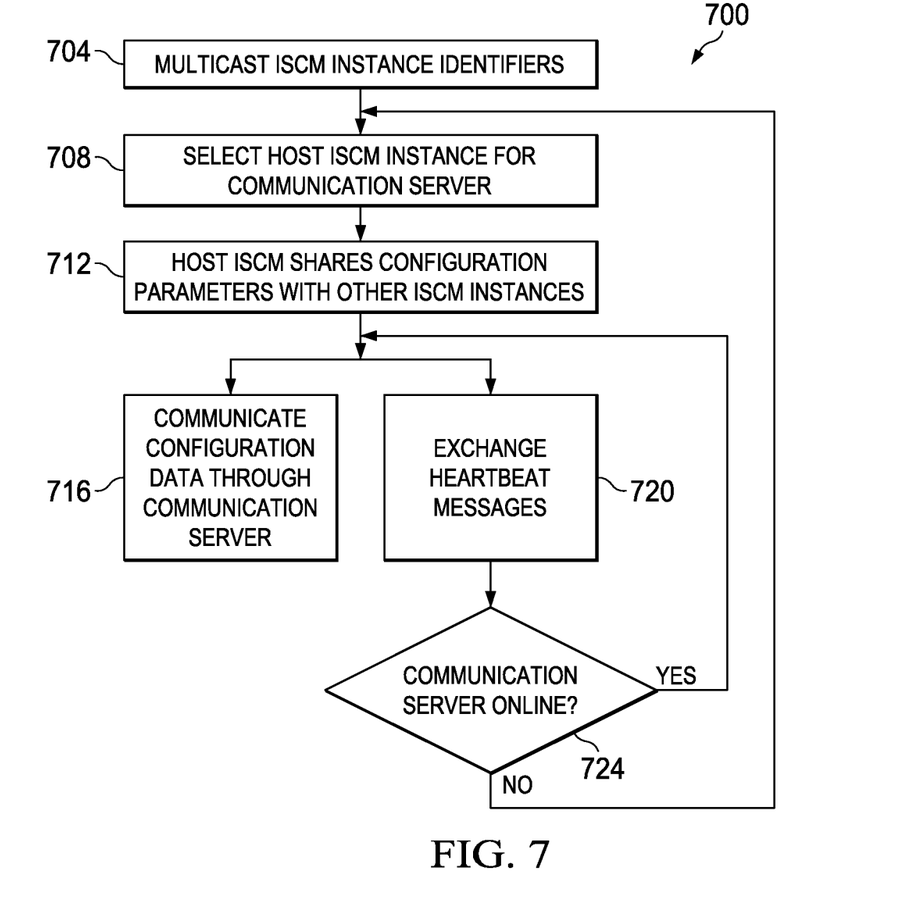
FIG. 7 illustrates an example method for configuring a communication server for a network in accordance with certain embodiments.

FIG. 7 illustrates an example method 700 for configuring a communication server for a network in accordance with certain embodiments. At step 704, ISCM instance identifiers are multicast among the ISCM instances of the network. At step 708, a host ISCM instance is selected to host a communication server. At step 712, the host ISCM share the configuration parameters of the communication server with the other ISCM instances. In alternative embodiments, this information may be shared during step 704 along with the ISCM instance identifiers.

At step 712, network configuration data may be communicated amongst the ISCMs via the communication server. For example, APBR requests may be communicated from an ISCM coupled to a service appliance 104 to one or more of the other ISCMs in the network. Concurrently, heartbeat messages may be exchanged by the communication server at step 720. Based on these messages it may be determined at step 724 whether the communication server is still online. If the communication server is still online, the ISCMs may continue to communicate through the communication server to other ISCMs. If the communication server has gone offline, a different ISCM is selected to the host the communications server at step 708. Communications may then resume at step 716 through the new communications server.

Some of the steps illustrated in FIG. 7 may be repeated, combined, modified or deleted where appropriate, and additional steps may also be included. Additionally, steps may be performed in any suitable order without departing from the scope of particular embodiments.

It is also important to note that the steps in FIGS. 6-7 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Additionally, it should be noted that with the examples provided above, interaction may be described in terms of one or more network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of selectively load balancing network traffic, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, at a network element, first network traffic directed to a first address associated with a first network node;
   forwarding the first network traffic to the first network node;
   receiving from the first network node, the first network traffic directed to a second address associated with a second network node coupled to the network element and a forwarding policy for a second network traffic, wherein the second network traffic originates from the second network node;
   identifying a plurality of ports of the network element, wherein the second network node is accessible from the network element through each of the plurality of ports;
   forwarding the first network traffic to the second network node via one of the plurality of ports;
   configuring the plurality of ports of the network element to apply the forwarding policy;
   receiving the second network traffic from the second network node at one of the plurality of ports; and
   applying the forwarding policy by forwarding the second network traffic to the first network node.

2. The method of claim 1, wherein the first network node is a service appliance operable to load balance network traffic among a plurality of servers, and wherein the second network node is one of the plurality of servers.

3. The method of claim 1, wherein configuring the plurality of ports of the network element to apply the forwarding policy comprises configuring the network element to set a next hop Internet Protocol address to the first address of the first network node for network traffic matching the forwarding policy.

4. The method of claim 1, wherein a first port of the plurality of ports is associated with a first virtual device context of the network element and a second port of the plurality of ports is associated with a second virtual device context of the network element.

5. The method of claim 4, further comprising storing the forwarding policy in a database shared by the first virtual device context of the network element and the second virtual device context of the network element.

6. The method of claim 1, further comprising:
   determining at least one additional network element in a network path from the network element to the second network node; and
   communicating the forwarding policy to the at least one additional network element.

7. The method of claim 6, wherein the second network traffic is received from the at least one additional network element.

8. The method of claim 6, wherein communicating the forwarding policy to the at least one additional network element comprises communicating the forwarding policy to a communication server hosted by a second network element for transmission to the at least one additional network element.

9. The method of claim 1, further comprising sending the first network traffic from the first network node to the second network node from a first port of the plurality of ports and receiving the second network traffic at a second port of the plurality of ports.

10. The method of claim 1, wherein the network element is a network switch capable of bridging and routing data packets.

11. An apparatus comprising:
a communication interface configured to communicate with a first network node and a second network node;
a processor configured to:
receive first network traffic directed to a first address associated with the first network node;
forward the first network traffic to the first network node;
receive from the first network node, the first network traffic directed to a second address associated with the second network node and a forwarding policy for a second network traffic, wherein the second network traffic originates from the second network node;
identify a plurality of ports of the communication interface, wherein the second network node is accessible through each of the plurality of ports;
configure the plurality of ports to apply the forwarding policy; and
receive the second network traffic from the second network node via one of the plurality of ports; and
forwarding logic to cause the second network traffic to be forwarded to the first network node.

12. The apparatus of claim 11, wherein the first network node is a service appliance operable to load balance network traffic among a plurality of servers, and wherein the second network node is one of the plurality of servers.

13. The apparatus of claim 11, wherein a first port of the plurality of ports is associated with a first virtual device context of the apparatus and a second port of the plurality of ports is associated with a second virtual device context of the apparatus.

14. The apparatus of claim 11, wherein the processor is further to:
determine at least one additional network element in a network path from the apparatus to the second network node; and
communicate the forwarding policy to the at least one additional network element.

15. The apparatus of claim 14, wherein the processor is configured to communicate the forwarding policy to the at least one additional network element by communicating the forwarding policy to a communication server hosted by a second network element for transmission to the at least one additional network element.

16. At least one computer-readable non-transitory media comprising one or more instructions that when executed by a processor of a network element configure the processor to cause the performance of operations comprising:
receiving, at a network element, first network traffic directed to a first address associated with a first network node;
forwarding the first network traffic to the first network node;
receiving from the first network node, the first network traffic directed to a second address associated with a second network node coupled to the network element and a forwarding policy for a second network traffic, wherein the second network traffic originates from the second network node;
identifying a plurality of ports of the network element, wherein the second network node is accessible from the network element through each of the plurality of ports;
forwarding the first network traffic to the second network node via at least one of the plurality of ports;
configuring the plurality of ports of the network element to apply the forwarding policy;
receiving the second network traffic from the second network node at one of the plurality of ports; and
applying the forwarding policy by forwarding the second network traffic to the first network node.

17. The media of claim 16, wherein the first network node is a service appliance operable to load balance network traffic among a plurality of servers, and wherein the second network node is one of the plurality of servers.

18. The media of claim 16, wherein a first port of the plurality of ports is associated with a first virtual device context of the network element and a second port of the plurality of ports is associated with a second virtual device context of the network element.

19. The media of claim 16, wherein the operations further comprise:
determining at least one additional network element in a network path from the network element to the second network node; and
communicating the forwarding policy to the at least one additional network element.

20. The media of claim 19, wherein communicating the forwarding policy to the at least one additional network element comprises communicating the forwarding policy to a communication server hosted by a second network element for transmission to the at least one additional network element.

* * * * *

UNITED STATES PATENT AND TRADEMARK OFFICE
CERTIFICATE OF CORRECTION

PATENT NO. : 9,935,882 B2  
APPLICATION NO. : 14/835435  
DATED : April 3, 2018  
INVENTOR(S) : Avni Baveja et al.

Page 1 of 1

It is certified that error appears in the above-identified patent and that said Letters Patent is hereby corrected as shown below:

On the Title Page

Add item (63) Related U.S. Application Data:
The present application claims benefit to U.S. Provisional Application Serial No. 62/161,004.

Signed and Sealed this
Fifteenth Day of May, 2018

Andrei Iancu
*Director of the United States Patent and Trademark Office*